US 9,762,898 B2

(12) United States Patent
Kishore et al.

(10) Patent No.: US 9,762,898 B2
(45) Date of Patent: Sep. 12, 2017

(54) METHOD AND SYSTEM FOR PARALLELIZING VIDEO COMPRESSION

(76) Inventors: Kelly Y Kishore, San Jose, CA (US); Gerard M. X. Fernando, Mountain View, CA (US)

( * ) Notice: Subject to any disclaimer, the term of this patent is extended or adjusted under 35 U.S.C. 154(b) by 1316 days.

(21) Appl. No.: 12/776,478

(22) Filed: May 10, 2010

(65) Prior Publication Data

US 2011/0188577 A1 Aug. 4, 2011

Related U.S. Application Data

(60) Provisional application No. 61/337,142, filed on Feb. 1, 2010.

(51) Int. Cl.
| H04N 7/26 | (2006.01) |
| H04N 11/00 | (2006.01) |
| H04N 19/00 | (2014.01) |

(52) U.S. Cl.
CPC ................................. H04N 19/00 (2013.01)

(58) Field of Classification Search
CPC ...................................................... H04N 19/00
USPC .......................... 375/240.01, 240.16, 240.24
See application file for complete search history.

(56) References Cited

U.S. PATENT DOCUMENTS

| 5,235,419 | A | * | 8/1993 | Krause | 375/240.16 |
| 5,579,050 | A | * | 11/1996 | Jung | 375/240.14 |
| 2005/0157792 | A1 | * | 7/2005 | Baba et al. | 375/240.16 |
| 2005/0201627 | A1 | * | 9/2005 | Liang et al. | 382/239 |
| 2005/0276329 | A1 | * | 12/2005 | Adiletta et al. | 375/240.16 |
| 2006/0050971 | A1 | * | 3/2006 | Page et al. | 382/232 |
| 2008/0063080 | A1 | * | 3/2008 | Madumbu et al. | 375/240.22 |
| 2008/0212675 | A1 | * | 9/2008 | Ohgose et al. | 375/240.16 |
| 2008/0212681 | A1 | * | 9/2008 | Yavits et al. | 375/240.16 |
| 2008/0316365 | A1 | * | 12/2008 | Choi et al. | 348/699 |
| 2009/0016430 | A1 | * | 1/2009 | Schmit et al. | 375/240.01 |
| 2009/0129688 | A1 | * | 5/2009 | Baba et al. | 382/236 |
| 2009/0180022 | A1 | * | 7/2009 | Kwon et al. | 348/362 |
| 2009/0225845 | A1 | * | 9/2009 | Veremeev et al. | 375/240.16 |
| 2010/0020877 | A1 | * | 1/2010 | Au et al. | 375/240.16 |

* cited by examiner

*Primary Examiner* — Jamie Atala
*Assistant Examiner* — On S Mung
(74) *Attorney, Agent, or Firm* — Useful Arts IP (57) ABSTRACT

Video data compression performance is improved through the use of multiple processors operating in parallel. The parallel processors perform motion or spatial estimation, where portions of a video frame are found to be similar to portions in reference frames. Because this estimation operation can be very time consuming, the use of multiple processors can reduce the overall time required, or they can enable higher-performing algorithms that might otherwise require a prohibitively long processing time. The motion or spatial estimation results are applied to reconstructed versions of the video frame data to enable high levels of video data compression.

18 Claims, 9 Drawing Sheets

Alternate Centrally-managed Scheduler

| Use Case Name | Motion Estimation Parallelization | |
|---|---|---|
| Goal | Minimize time for motion Estimation through concurrency | |
| Summary | Minimize the time for motion estimation by distributing the tasks in a fashion where multiple motion estimator resource can process in parallel | |
| Actors | Encoder, Motion Estimation System (MES) (MES may be inside or outside of the Encoder), Motion Estimation Resource (MER) | |
| Stakeholders | End user (waits on the overall encoding time) | |
| Preconditions | Estimation tasks must be independent from each other | |
| Triggers | Encoder asks the MES for motion vectors (MV) | |
| Basic Course of Events | Step | Action |
| | 1 | Encoder sends content to MES |
| | 2 | Encoder sends rules to MES |
| | 3 | MES determines available motion estimation resource (MER) for delegating motion estimation (ME) tasks |
| | 4 | MES delegates tasks to multiple available MERs |
| | 5 | MES sends the dataset to MER |
| | 6 | MES sends the prediction reference dataset to MER |
| | 7 | MES sends rules to MER |
| | 8 | MER performs motion estimation |
| | 9 | MER returns results to MES |
| | 10 | MES returns results to Encoder |
| | 11 | Encoder uses results as part of the encoding process |
| Alternate Paths | Step | Branching Action |
| | 1.1 | Encoder sends reference (pointer) of content to MES |
| | 1.2 | Go to step 3 |
| | 2.1 | Encoder does not send rules to MES |
| | 2.2 | Go to step 3 |
| | 5.1 | MES sends the reference (pointer) of the dataset to MER |
| | 5.2 | Go to step 6 |
| | 6.1 | MES sends the reference (pointer) of the prediction reference dataset to MER |
| | 6.2 | Go to Step 7 |
| | 7.1 | MES does not send rules to MER |
| | 7.2 | Go to step 8 |
| | 9.1 | MER stores results in a location accessible to MES |
| | 9.2 | MES retrieves results |
| | 9.3 | Go to step 10 |
| | 10.1 | MES stores results in a location accessible to Encoder |
| | 10.2 | Encoder retrieves results |

*FIG. 8*

| Use Case Name | Spatial Estimation Parallelization for Frames |
|---|---|
| Goal | Minimize time for Spatial Estimation through concurrency |
| Summary | Minimize the time for Spatial estimation by distributing the tasks in a fashion where multiple spatial estimator resources can process in parallel |
| Actors | Encoder, Spatial Estimation System (SES) (SES may be inside or outside of the Encoder), Spatial Estimation Resource (SER) |
| Stakeholders | End user (waits on the overall encoding time) |
| Preconditions | Estimation tasks must be independent from each other |
| Triggers | Encoder asks the SES for the reference prediction locations |

| Basic Course of Events | Step | Action |
|---|---|---|
| | 1 | Encoder sends content to SES |
| | 2 | Encoder sends rules to SES |
| | 3 | SES determine available spatial estimation resource (SER) for delegating Spatial estimation (SE) tasks |
| | 4 | SES delegates tasks to multiple available MERs |
| | 5 | SES sends the dataset to SER |
| | 6 | SES sends the prediction reference dataset to SER |
| | 7 | SES sends rules to SER |
| | 8 | SER performs spatial estimation |
| | 9 | SER returns results to SES |
| | 10 | SES returns results to Encoder |
| | 11 | Encoder uses results as part of the encoding process |
| Alternate Paths | Step | Branching Action |
| | 1.1 | Encoder sends reference (pointer) of content to SES |
| | 1.2 | Go to step 3 |
| | 2.1 | Encoder does not send rules to SES |
| | 2.2 | Go to step 3 |
| | 5.1 | SES sends the reference (pointer) of the dataset to SER |
| | 5.2 | Go to step 6 |
| | 6.1 | SES sends the reference (pointer) of the prediction reference dataset to SER |
| | 6.2 | Go to Step 7 |
| | 7.1 | SES does not send rules to SER |
| | 7.2 | Go to step 8 |
| | 9.1 | SER stores results in a location accessible to SES |
| | 9.2 | SES retrieves results |
| | 9.3 | Go to step 10 |
| | 10.1 | SES stores results in a location accessible to Encoder |
| | 10.2 | Encoder retrieves results |

*FIG. 9*

METHOD AND SYSTEM FOR PARALLELIZING VIDEO COMPRESSION

RELATED APPLICATION

This applications claims priority of U.S. Application Ser. No. 61/337,142 of the present inventors filed Feb. 1, 2010, entitled Method and Apparatus of Parallelizing Compression, incorporated herein by reference.

BACKGROUND

The present invention relates to parallel video compression.

Video data is often compressed in order to efficiently transmit the data or to reduce the storage requirements of the data. The compression process may require considerable processing time. It is often desirable to reduce the compression time or encoding time. Different methods can be used to achieve such reduction. One method is to parallelize the compression process. Parallelizing the compression task may also be used to improve the quality of the compressed video that can be obtained within a given amount of time.

Within the overall compression process, there exist various different compression steps including, for example, estimation, compensation and encoding. Estimation involves identifying similarities between portions of the same image or different images. Similarities may be identified in the form of similarity vectors, such as motion vectors. Compensation subtracts from a current region a reference region that was determined to be most similar to thereby obtain "residuals." The reference region may be, for example, a reconstructed reference region (the version of the reference region that will be available to the decoder during decoding). Encoding uses similarity vectors and residuals to construct a video file or video stream. Although directional estimation expressed in terms of estimation vectors is commonly used, other forms of estimation have no associated direction. For example, one form of spatial estimation averages nearby values. In the following description, the term "estimation results" is used to include both estimation vectors and other estimation results having no associated direction.

A time-consuming step in video compression is motion estimation, in which a current region within an image frame is compared to regions in other image frames, which may occur temporally before or after the current image frame. When a good match is found, the data for that region can be compressed by including a reference to the location of the match. The compressed data will include information about differences between the current region and the matched region. Typically, such differences will be in relation to the decompressed, or decoded, version of the matched region; in other instances, the differences may be between the current region and the original matched region. Similarly, a region within an image frame can be compared to other regions within the same image frame. In this case, a good match is found within the same image frame because of recurring spatial image patterns. "Estimation" is used herein to refer to the finding of similar regions within different image frames, or to the finding of similar regions within both different image frame(s) and the same frame.

Motion estimation and spatial estimation are often very time consuming and computationally intensive and may involve various block matching algorithms (BMAs). For example, motion estimation or spatial estimation may be used to find two or more matches to a region, where an interpolation or other combination of the matches may be used to further improve the image compression. Also by way of example, motion estimation or spatial estimation may find that a current region best matches another region after the other region has been interpolated to generate video samples between the originally existing pixels. In both examples, these algorithms may improve the quality of the compressed data, but the increased complexity of the algorithms require increased execution time.

Encoding is typically done serially at the frame level since there exists a potential dependency on previously encoded frames that may be used as a reference for the current frame. That is, a block of video data within a frame may be encoded by a reference to a portion of a previous frame, plus the differences between the current block and the decoded version of that reference. This process requires that any reference frames that an encoder may want to use for encoding a current frame be previously processed.

By way of example, consider that for a given encoder, each frame takes X seconds for motion estimation, and thus a piece of content that has Y number of frames will take X*Y number of seconds for the estimation portion. Current motion estimation processes use previously encoded frames as references and thus, at the frame level, estimation is done in series. Due to this causality, compression algorithms may attempt to reduce their execution time of the motion estimation component through a reduction of trial matches within each frame, using a "best guess" approach and not necessarily a best match approach. This kind of solution is not readily scalable in terms of encoding time, and potentially results in even less encoding efficiency in the encoded result. Encoding efficiency may be defined in terms of execution time, subjective quality, objective quality, bitrate, overall file size, etc. This same observation applies to subframes as well, where a subframe is defined as a subset of a frame.

Compared to motion estimation, spatial estimation within a frame has a smaller set of potential candidates, all of which are within the frame itself. Spatial estimation is also considered to be computationally intensive, but not as much as motion estimation. The challenges described in the previous paragraph also apply to spatial estimation.

Following estimation and compensation, encoding takes place. In MPEG video compression, three types of coding frames are commonly used. I-frames are "intra-coded", meaning that they refer only to themselves and do not rely on information from other video frames. P-frames are "predictive frames." I-frames and P-frames are called anchor frames, because they are used as references in the coding of other frames using motion compensation. The first P-frame after an I-frame uses that I-frame as a reference. Subsequent P-frames use the previous P-frame as a reference. Additionally, B-frames (bi-directional frames) are coded using the previous anchor (I or P) frame as a reference for forward prediction, and the following I- or P-frame for backward prediction. An important point to note is that any errors in reference frames can propagate to frames which use the reference frames. For example, errors in a given P-frame can propagate to later P-frames and B-frames. A group of pictures (GOP) may consist, for example, of a series of frames such as: I-B-B-B-P-B-B-B-P-B-B-B-P. A GOP where all predictions do not refer to frames outside itself is considered a closed GOP. Vice versa, if any predictions refer to frames outside the GOP, then it is considered an open GOP.

By using concurrent processing of multiple processors to perform motion estimation, the video compression processing time can be reduced. However, previous attempts to improve processing speeds by performing parallel motion estimation have had undesirable limitations. In particular, parallel video encoding arrangements are known in which each of multiple slaves receives a frame to be encoded together with its reference frames, where the references are the raw (original) frames. Upon receipt, each slave performs motion encoding (including both estimation and compensation) of the frame using the raw reference frames, and then returns the encoded frame to a master. For example, Jeyakumar and Sundaravadivelu (Proceedings of the 2008 International Conference on Computing, Communication and Networking, "Implementation of Parallel Motion Estimation Model for Video Sequence Compression") describe one such approach to parallelizing video sequence compression by using multiple processors. Nang and Kim (1997 IEEE, "An Effective Parallelizing Scheme of MPEG-1 Video Encoding on Ethernet-Connected Workstations") also propose a similar method of parallelizing video compression.

In the foregoing arrangements, each slave performs the compensation based on the raw references frames and not the reconstructed reference frames. For lossy compression, since the decoder does not have access to the raw frames, during reconstruction (using the residuals), the decoder will use reconstructed frames as references. The result is a reconstruction mismatch between the encoder and decoder. This type of mismatch will propagate errors further in the decoder to other frames, continually using mismatched results as references until the next keyframe. This mismatch can become problematic where the GOP size is large or when higher lossy compression is applied.

BRIEF SUMMARY

The present invention is defined by the following claims, and nothing in this section should be taken as a limitation on those claims. Methods and systems are described for improving video compression processing times using parallel processing by multiple computing resources. Using parallel processing with reference frames chosen so as to be independent of other frames, the video compression processing time can be reduced. The methods and apparatus described will allow very large-scale parallelization of motion estimation that is highly scalable among multiple systems in a distributed system. The method and apparatus also allow similar parallelization of spatial estimation.

In one embodiment, motion estimation and/or spatial estimation of video frames is performed using raw, or original, versions of reference frames. The motion estimation results or spatial estimation results which are determined by the parallel processors are then passed to a portion of the video encoder which uses those results in conjunction with decoded versions of the reference frames to generate compensated video data. The compensated video data is typically the difference between the current video data and some version of the decoded reference video data. The version of the decoded video data may be a set of data directly extractable from the decoded data stream, or it may be an interpolation between pixels from within the decoded data, or it may be derived from a combination of different decoded frames or from multiple areas within one or more decoded reference frames. Other types of processing are also possible. The compensated video data is then transformed, such as with a discrete cosine transform (DCT), then quantized, such as with a non-linear quantizer, and then compressed, such as with an optimized Huffman code, prior to insertion into a video data stream.

The parallel processors can reduce the time required to compress video, or can improve the quality of the compression which is achievable within an amount of time, while not introducing additional errors into the video in the compensation processing step.

BRIEF DESCRIPTION OF THE DRAWINGS

The present invention may be further understood from the following description in conjunction with the appended drawings. In the drawings:

FIG. 5A and FIG. 5B will be referred to as FIG. 5 below, when reference is to the composite.

FIG. 8 is a use-case description of motion estimation parallelization.

FIG. 9 is a use-case description of spatial estimation parallelization.

DETAILED DESCRIPTION

Described herein are methods and apparatuses that allow very large scale parallelization of video data motion estimation that is highly scalable among multiple systems in a distributed system. The method and apparatus also allow similar parallelization of video data spatial estimation.

Motion estimation tasks are independent and executed in parallel among multiple frames or group of pictures (GOP) by distributed resources. The motion estimation bases the reference off the original frame so as to eliminate inter-frame dependence. The encoder distributes motion estimation processes to multiple resources where each system acquires one or more current frames to perform motion estimation, and their corresponding original reference frames. A video frame can be broken down in subsets of subframes or blocks. The parallelization can be done at different levels including the subframe level or a group of blocks.

For a given encoder, assume, by way of example, that if each frame takes X seconds to motion estimate, then content that has Y number of frames and Z number of processors will take roughly X*roundup(Y/Z) seconds to process. In contrast, if the motion estimation is inter-frame dependent, then the parallelization of the estimation can be done a higher level, such as using a closed GOP. If the GOP size is 15 frames then the minimum time for an encoder to complete the motion estimation will be roughly X*15*roundup(Y*(1/15)/Z) if Y>Z*15 and assuming that X*15 is the average number of seconds to motion estimate a GOP.

Depending up on the speed of the processor, memory size, caching, etc. it may be more efficient to perform estimation for more than one frame but less than a GOP.

Figure 1:
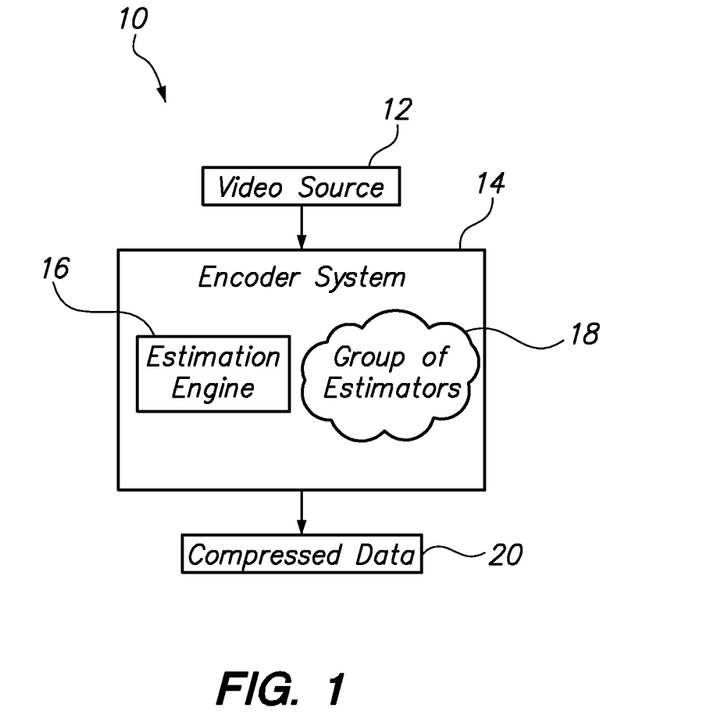
FIG. 1 is a block diagram of a video encoder system.

FIG. 1 shows a video encoding environment 10. The environment 10 includes a video source 12, a video encoder system 14, and generated, compressed video data 20. The video encoder system 14 includes an estimation engine 16 and a group of estimators 18. Additional, different or fewer components may be provided.

In one embodiment, the video source 12 is a storage medium, such as a computer hard disk or other computer-accessible data storage medium. In another embodiment, the video source 12 is a live data stream coming from a video camera. Video data from the video source is input into the video encoder system 14. The video encoder system logically includes an estimation engine 16, and a group of estimators 18. The estimation engine 16 and each estimator within the group of estimators 18 are processing resources capable of executing a processing algorithm. The resources may be a thread, a central processing unit (CPU), CPU core, a digital signal processing (DSP) chip, a graphics processing unit (GPU) or a system or aggregation of CPUs or other processors which can perform operations on one or more datasets. Other types of currently known or not-yet-known processors may be used.

The output of the video encoder system 14 is compressed video data 20. The compressed video data 20 may be stored on a computer storage medium, such as a hard disk, or may be directly transferred to computer or may be transferred, such as over the internet, to another location for storage, further processing, or viewing.

Figure 2:
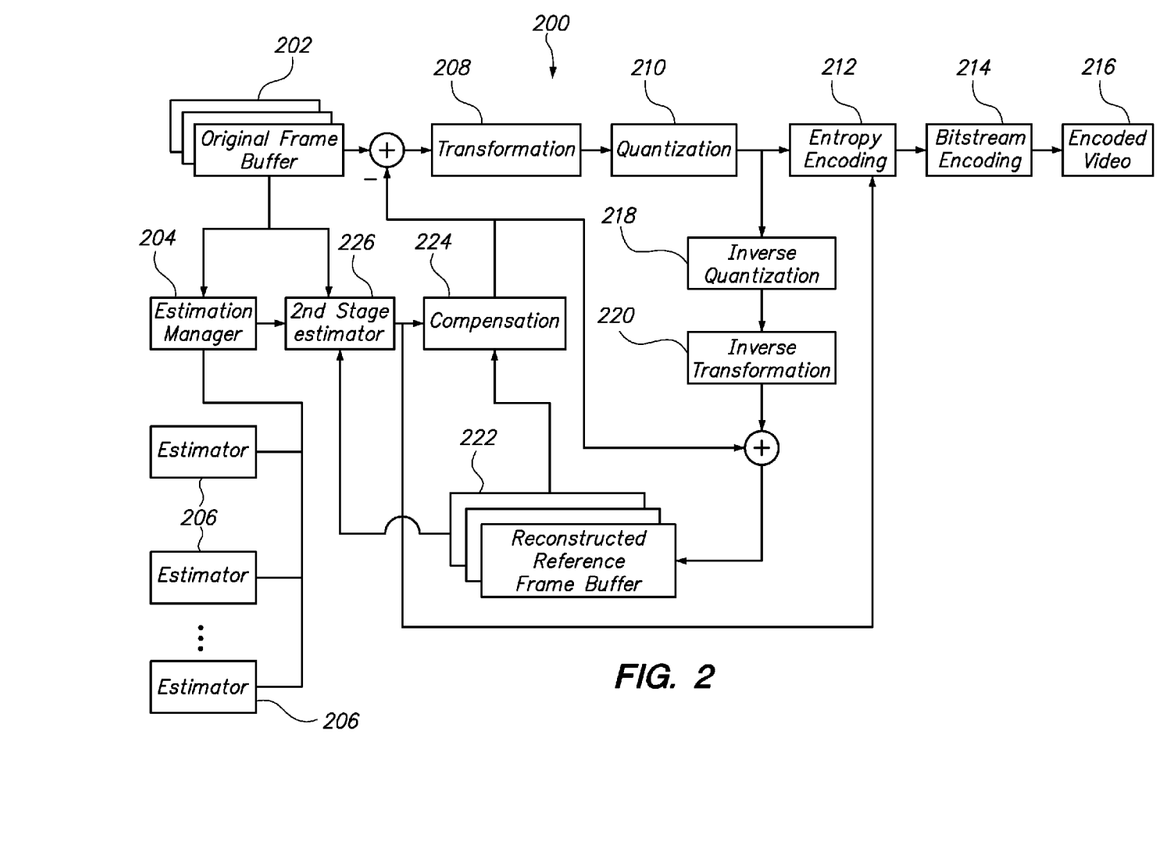
FIG. 2 is a video encoder processing block diagram.

FIG. 2 is a block diagram of a video encoder system 200. The system includes original frame buffer 202 and processing steps comprising transformation 208, quantization 210, entropy encoding 212, and bitstream encoding 214 to generate encoded video 216. The encoder system 200 also comprises processes for inverse quantization 218 and inverse transformation 220, which are used to populate the reconstructed reference frame buffer 222. The original frame buffer 202 provides the input to an estimation manager, which directs or facilitates the distribution of the video frame data to parallel processing estimators 206. The estimation manager 204 passes the results of the estimators 206 to a second stage estimator 226 which passes its results to a compensation processor 224. The second stage estimator 226 is optional. If it does not exist then the result of the estimator 206 will be passed directly to the compensation processor 224. The second stage estimator 226 either uses original frames from the original frame buffer 202 to perform the second stage estimation, or it may use the original frames from the original frame buffer 202 and reconstructed frames from the reconstructed reference frame buffer 222. The results of the second stage estimation may or may not contain a subset of the results of the estimation manager 204. The compensation processor 224 computes difference between the estimated video from the estimation manager 204 or the second stage estimator 226 and the reconstructed reference frames from the reconstructed reference frame buffer 222 so that this compensated data can be subtracted from the original frame, as the difference data can be compressed more efficiently. More or fewer processing steps can be incorporated.

The original frame buffer 202 contains image data which can be broken down into subsets consisting of subframes, macroblocks, or blocks. A subframe is a set of one or more macroblocks within a frame. A macroblock is a group of one or more blocks. A block is an M-row by N-column, or M×N, matrix of samples. The values of M and N may or may not be equal. To facilitate compression of the video data, the blocks undergo a transformation 208, which is typically a discrete cosine transform (DCT), although other transforms may be used, or no transformation may be used. The transformed data block may be from the original video data, or it may be a compensated data block derived using the compensation 224 processing to facilitate greater compression. The estimation manager 204 or the secondary estimator 226 provides the estimation results. After transformation 208, the block of video data is quantized by a quantization process 210 to reduce the number of bits. The quantized data undergoes entropy encoding 212 to further reduce the number of required bits by using codes, such as Huffman codes, that use a small number of bits to encode frequently encountered values, and longer bit codes for values that are less frequently encountered, as is known in the art. Other entropy or compression encoding methods may be used, or entropy encoding may be bypassed entirely.

The entropy encoded data undergoes bitstream encoding 214, where the bits are put into a predefined structure, as is known in the art, along with the estimation parameters and other parameters to generate the encoded video 216. The bitstream encoding 214 may also include audio data, metadata, or other data that is associated with the video data. The encoded video 216 contains all that is required for a decoding device to reconstruct an approximation of the original frames. The approximation is typically not exact because of the transformation 208 and quantization 210, which allows higher compression rates to be achieved.

In order to mimic the processing that will be performed within a video decoder, the output of the quantizer 210 is put through an inverse quantization process 218 and then inverse transformed 220, generating a lossy version of the compensated video. Where motion or spatial estimation was previously used on the current video data, the values of that compensated video data are added back in to the video data to generate the reconstructed reference frame, or frames, from the reconstructed reference frame buffer 222. Finally, compensation 224 processing uses the location or locations determined by the estimation manager, in conjunction with the previously generated reconstructed reference frames from the reconstructed reference frame buffer 222, to generate a compensated data block which is subtracted from the current original video frame from the original frame buffer 202.

The processing in video encoder system 200 can be applied to datasets that can comprise one or more frames, subframes, macroblocks, or blocks. The reconstructed reference frames from the reconstructed reference frame buffer 222 can similarly consist of one or more frames, subframes, macroblocks, or blocks. Typically the input of the video encoder system 200 is the video content in a format where it is already portioned into frames, but this is not necessarily the case, and one skilled in the art would make adjustments if additional processing were required to put the video data into a suitable format for the video encoder system 200.

The estimation manager 204 determines one or more prediction references for a given set of video data, such as a block, macroblock, or subframe. To find the prediction references, estimators 206 look for similar video data in previously processed frames that have been labeled reference frames. Alternatively or additionally, estimators 206 may look for similar video data in the current frame. The latter process is commonly called spatial estimation.

Figure 3:
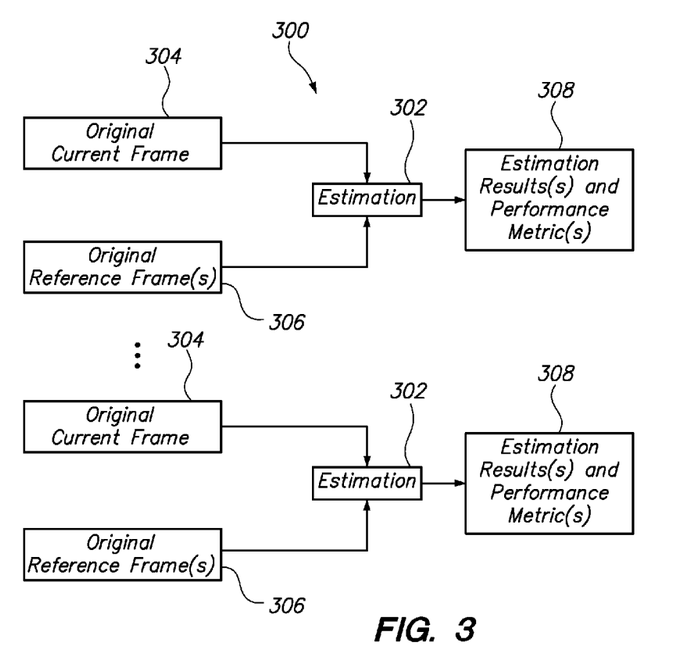
FIG. 3 is a set of parallel processing estimators.

FIG. 3 shows estimation parallel processing 300. Each of a set of estimators 302 operates on an original current frame 304 and one or more original reference frames 306 to generate one or more estimation results and one or more associated performance metrics 308. The reference frames 306 may also include the original current frame 308. Estimation results may also include a mode decision. For example, if the estimation manager keeps track of which estimator is doing spatial estimation and which estimator is doing motion estimation, then the estimation manager may not need a mode decision to be returned from the estimators. However, if the estimation manager simply delegates tasks, or if the system runs in a self-managed environment, then the estimation manager may need the estimators to return a mode decision to enable the estimation manager to know what estimation type the data is referring to.

The estimators 302 are processing resources, such as central processing units (CPUs) or other processors as are known within the video processing art or within the computer processing art, or which may be developed in the future. The estimators may be physically located close to the estimation manager 204, or some or all of the estimators 302 may be located elsewhere, in either a known or an unknown location, and connected in either a wired or wireless communication path to the estimation manager, and either in a wired or wireless communication path to the video data. Different processors may be different types of processors, and may be in communication with the estimation manager 204 and connected to the original current video data 304 and original reference frames 306 in different ways, which may be either currently known or not yet known in the art.

Multiple estimators 302 may use different algorithms on a same set of video data. The generated performance metrics 308 may be used to decide which estimations will ultimately be used in the video encoding.

Additionally or alternatively, multiple estimators 302 may process different original frames, subframes, or sets of frames, so that the overall processing time required to encode a video data set is reduced. By using multiple estimators 302 the performance of the video encoder is improved, where the performance can be measured in terms of processing time, video compression, the quality of the video after it is ultimately decoded, or any combination of these factors or other related factors. The number of estimators 302 may be a small number, such as 2 to 10, or it may be a large number, such as hundreds or thousands.

Note that the estimators 302 use original versions of the reference frames 306. When the estimates are applied by the compensation processing 224, the motion or spatial estimates will be applied to the reconstructed reference frames from the reconstructed reference frame buffer 222. Because of this difference, there is the chance for slightly less than ideal performance within the compensation process. For example, a region within a current video frame may closely match two regions within a prior original reference frame. It may match the first slightly better than the second, whereas, when comparing the region with the reconstructed reference frame, which is a noisy version of the original reference frame, the region may match the second region slightly better than the first. This effect, and the resulting possible slight improvement in the ultimate compression ratio, is believed to be small compared with the benefit that can be achieved by using multiple parallel estimators.

Additionally or alternatively, the second stage estimator 226 enables a more ideal compensation process to be achieved. The estimation manager 204 will generate a set of candidates which will then be used by the second stage estimator 226 to obtain more ideal estimates using either only original frames from the original frame buffer 202 or a combination of original frames from the original frame buffer 202 and reconstructed reference frames from the reconstructed reference frame buffer 222.

Estimation Management

Estimation management can be approached in multiple ways. Two embodiments are a centrally-managed system and a self-managed system.

In the centrally-managed system, the management system delegates the operation of motion and spatial estimation to any available resources. Availability may be determined by the execution state of the resource or by the type of estimation it can execute. The management system may reside within or outside the encoder. The computing resources may reside inside or outside of the encoder.

Resources are given access to datasets and their respective potential reference datasets. The resource may receive the datasets from the management system, or they may receive reference, or pointers, to the datasets, or other information that will enable them to access the datasets.

The computing resource then performs a motion or spatial estimation based on a set of rules. The rules may either be sent to the resource, or they may be predefined. The rules provide a constraint in the selection of the reference dataset.

Such rules may include none, one, or more of the following: (a) the dataset number on which prediction estimation is to be performed, (b) the length of the dataset or the number of datasets on which estimation is to be performed, (c) the number of references that can be used, (d) the number of forward references that can be used, (e) the number of backward references that can be used, (f) the number of bi-directional references that can be used, (g) the number of grouped referenced that can be used, (h) the farthest reference frame from the current frame that can be used, and (i) the algorithm(s) to apply.

Each computing resource performs the appropriate motion estimation or spatial estimation independent from other estimation computing resources.

The estimator determines the prediction based on available algorithms. As each resource completes the estimation process, the resource sends the requested motion estimation or spatial estimation information back to the estimation management system.

As the management system receives each response from the resources, the management system relays the information back to the encoder. The encoder then utilizes the information in the encoding process.

Figure 4:
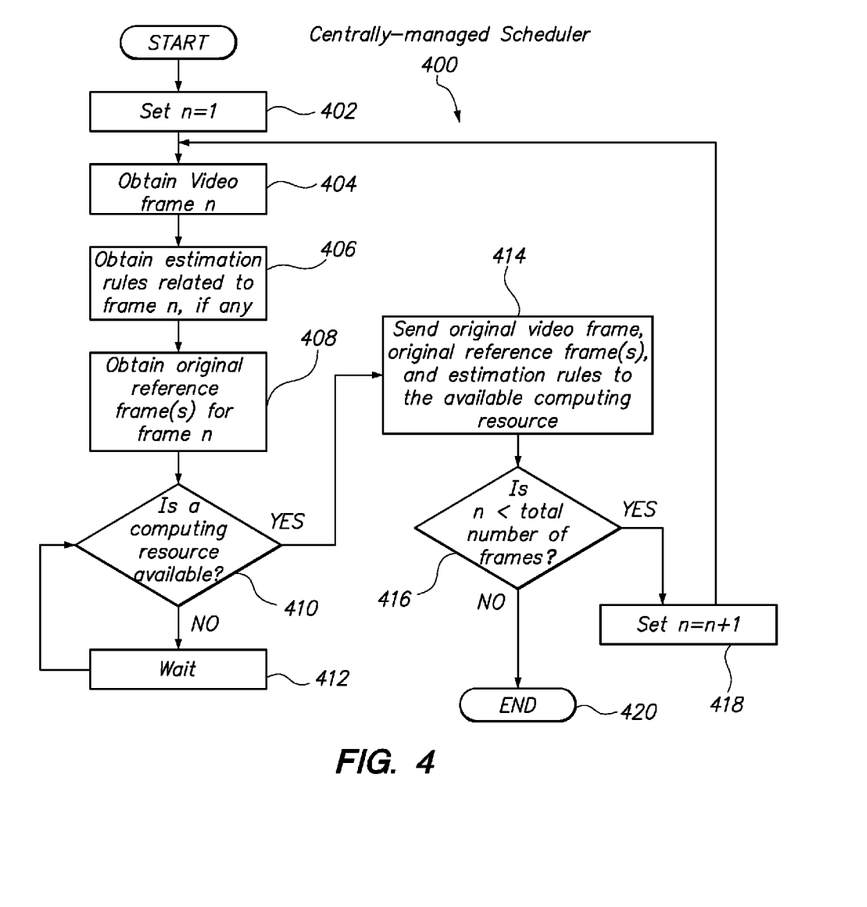
FIG. 4 is a flowchart for a centrally-managed system for directing the parallel processing resources.

FIG. 4 illustrates a flowchart for a first example of a centrally-managed system for directing a set of estimators. A managing processor sets a frame counter n to 1 as an initial step 402. The value of the counter is not necessarily the frame number with respect to time. Video frame n is then obtained (404), and any estimation rules pertaining to frame n are also obtained (406). Rules may include, for example, what reference frames, if any, are to be used. Original reference frames for the current frame are then obtained (408). A determination is made as to whether or not a computing resource is available (410). If not, the managing processor waits (412) and then reassesses the availability of resources. When a computing resource is available, the managing processor sends the original video frame, original reference frames, and estimation rules to the available computing resource (414). Alternatively, the managing processor may pass pointers to the video data, or other information that would enable the computing resource to access the video data. Similarly, the managing processor may pass estimation rules, or estimation processing code, or pointers to such processing code, or other information that may be required for the computing resource to perform the required estimation.

The managing processor then determines whether or not more frames need to be processed (416), and if not the centrally-managed process ends (420), or otherwise the frame counter is increased (418) prior to obtaining the next video frame (404).

Many modifications may be made without departing from the spirit or intent of the flowchart of FIG. 4. For example, the frame counter could be initialized to a number other than 1. The steps 404, 406, and 408 may be performed in any order. In step 414, rather than sending the video or rule data, pointers to these data may be sent.

Figure 5A:
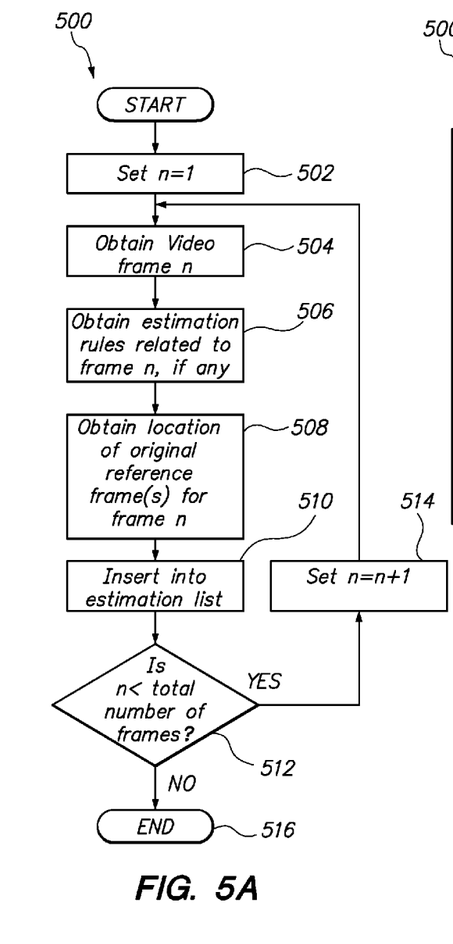
FIG. 5A and FIG. 5B are flowcharts for an alternate centrally managed system for directing processing resources.
Figure 5B:
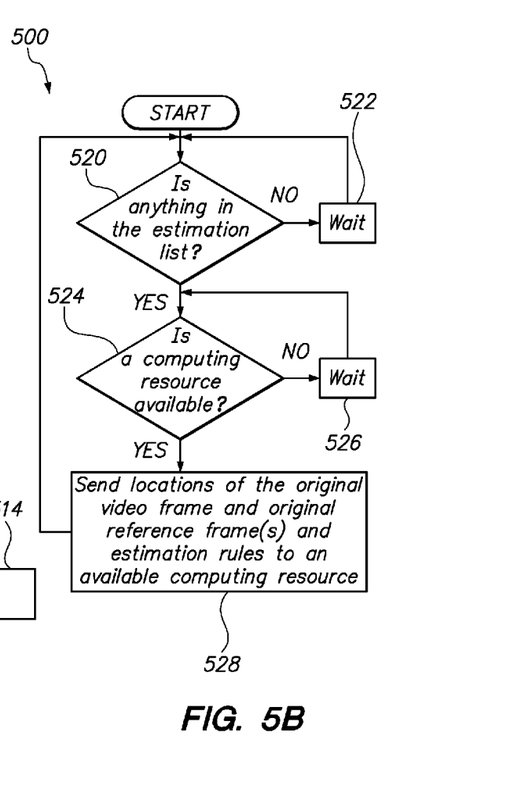

FIG. 5 illustrates an alternate embodiment of a centrally-managed system for directing a set of estimators. FIG. 5A illustrates a flowchart for a preparatory portion of the processing, and FIG. 5B illustrates a flowchart for a secondary portion of the processing. The two processes may be run sequentially on a single processor, or may be run in parallel by two processors to potentially further improve the performance of the video encoder.

As shown in FIG. 5A, the processor initially sets a frame counter to 1 as an initial step 502. Video frame n is then obtained (504), and any estimation rules pertaining to frame n are also obtained (506). Examples of rules are described in the description of FIG. 4. Locations of the original reference frames are obtained (508), and the video frame data, reference frame data, and estimation rules, if any, are inserted into an estimation list (510). The current frame number is compared (512) with the total number of frames, and if it is less the frame counter is incremented (514) and the next video frame obtained (504), otherwise the process ends (516).

In a subsequent or parallel process, shown in FIG. 5B, the processor checks (520) to see if there is anything in the estimation list. If not, it waits (522) and rechecks. Once something is found in the estimation list, the processor checks (524) for an available computing resource. If none is found the processor waits (526) and returns to (520). When an available processor is found (528), it sends the locations of the original video frames and the original reference frames and any estimation rules to the available computing resource, and then returns to (520).

Figure 6:
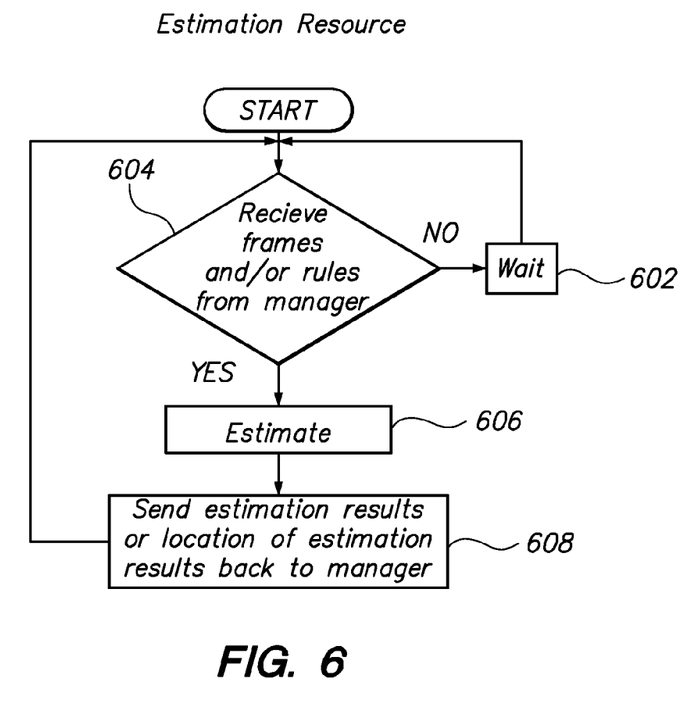
FIG. 6 is a flowchart for an estimation resource within a centrally-managed estimation resource system.

FIG. 6 is a flowchart for an estimation processing resource for use in conjunction with either of the centrally-managed systems of FIG. 4 or FIG. 5. In this process, the estimation resource waits (602) until it has received (604) the video frames and any required estimation rules from the resource manager. The process then performs the motion or spatial estimation (606) using the retrieved frames and any associated rules. The estimation results, which may include associated performance metrics, are then sent (608) back to the manager. This may involve sending the actual estimation data, or it may involve sending a memory pointer to the data, or the process may simply inform, either directly or indirectly, that the information has been placed in a location known to the resource manager. The process then loops back to check for receipt of additional data to be processed.

In the self-managed estimation management system, the resource does not receive the dataset or references to the dataset directly from the management system. Rather, the resources query a queue or a set of queues from which tasks are available to execute. As tasks appear on the queue, each resource reserves a task from the queue, completes the task, and stores the results in a data structure with a unique identifier for the encoder to retrieve. The unique identifier is used to associate the results with the task.

Figures 7A, 7B:
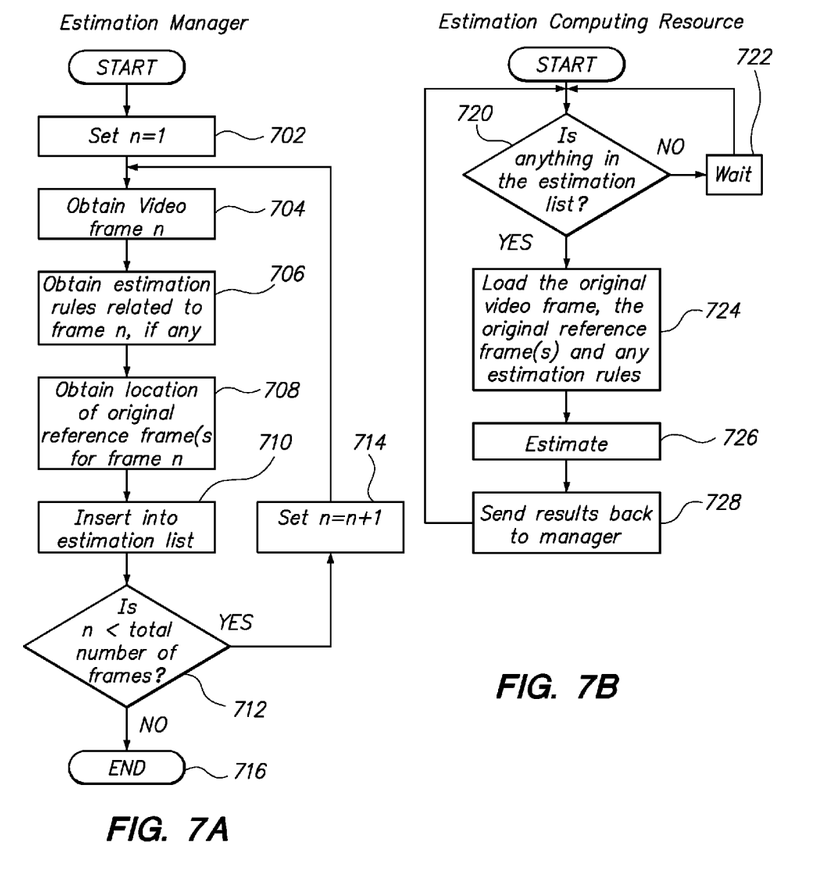
FIG. 7A and FIG. 7B are flowcharts for an estimation manager and an estimation resource, respectively, within a self-managed estimation resource system.

FIG. 7A is a flowchart for an estimation manager, and FIG. 7B is a flowchart for an estimation resource, where both the estimation manager and the estimation resource comprise a self-managed estimation resource management system.

FIG. 7A is similar in to the previously described FIG. 5A, as both figures show a method for loading an estimation list with tasks to be performed by other processors.

As shown in FIG. 7A, the processor initially sets a frame counter to 1 as an initial step 702. Video frame n is then obtained (704), and any estimation rules pertaining to frame n are also obtained (706). Examples of rules are described in the description of FIG. 4. Locations of the original reference frames are obtained (708), and the video frame data, reference frame data, and estimation rules, if any, or pointers thereto, are inserted into an estimation list (710). The estimation list is stored in a memory location that the estimation resources are able to access. The current frame number is compared (712) with the total number of frames, and if it is less the frame counter is incremented (714) and the next video frame obtained (704), otherwise the process ends (716).

A separate flowchart, to be carried out by two or more processors operating in parallel, is shown in FIG. 7B. As a processing resource becomes available, the resource checks (720) to see if there is anything in the estimation list. If not, it waits (722) and rechecks. Once something is found in the estimation list, the processor obtains (724) the original video frame data, the original reference frame data, and the estimation rules. This data may be in the estimation list that was generated by the estimation manager of FIG. 7A, or that estimation list may contain pointers or other information instructing the estimation resource where the data can be located. The estimation resource performs the estimation (726), and then sends the estimation results or the location of the estimation results back to the estimation manager (728). The processing resource then proceeds to look for another entry, or estimation task, in the estimation list (720). Many variations will be obvious to one implementing such an algorithm. For example, after a processor identifies a task in the estimation list, it may delete that task from the list, or it may reserve that task and later mark it as complete, so that multiple processors do not needlessly operate on the same video dataset with the same estimation algorithm.

FIG. 8 is a description of an alternate embodiment of motion estimation parallelization. The embodiment goal, summary, actors, stakeholders, preconditions, triggers, basic course of events and alternate event paths are all shown within FIG. 8 using a "Use Case" description format, as is common in the art.

FIG. 9 is a description of an embodiment of spatial estimation parallelization for frames. As in FIG. 8, the embodiment goal, summary, actors, stakeholders, preconditions, triggers, basic course of events and alternate event paths are all shown within FIG. 9 using a "Use Case" description format, as is common in the art.

Other techniques for handling estimation management are possible, which may be slight or significant deviations from the embodiments that have been described, as might be reasonably adapted by one skilled in the art. For example, multiple parallel management processors may operate as described in FIG. 5B to further direct a larger number of estimation resources. As another example, multiple motion or spatial estimation algorithms may be run on a video data set, with the estimation results including performance metrics, which may be used to decide which of the various algorithm results to incorporate into the video compensation.

While the invention has been described above by reference to various embodiments, it will be understood that many changes and modifications can be made without departing from the scope of the invention. For example, the communication between the processors may be wired or wireless, or the processors themselves may be incorporate components that are capable of parallel processing. Techniques generally described herein for motion estimation across frames can similarly be applied to spatial estimation within a video frame, and vice versa.

It is therefore intended that the foregoing detailed description be understood as an illustration of the presently preferred embodiments of the invention, and not as a definition of the invention. It is only the following claims, including all equivalents that are intended to define the scope of the invention.

What is claimed is:

1. A method of video compression of a sequence of video frames comprising:
performing temporal estimation on a set of video frame data by, for each of at least some frames of the video frame data, comparing the frame of video frame data with at least one other frame of video frame data, wherein the at least one other frame of video frame data is an original frame of video frame data that has not been compressed or decompressed in the course of said video compression, wherein temporal estimation of a first subset of frames of the video frame data is computed independently of, and in parallel with, temporal estimation of a second subset of frames of the video frame data; and
using results of said estimation, performing compensation of at least one of the first subset of frames of video frame data and the second subset of frames of video frame data in a manner which is dependent on compensation of the other of the first subset of frames of video frame data and the second subset of frames of video frame data;
wherein said compensation is performed using reconstructed frames of video frame data that have been compressed and decompressed in the course of said video compression.

2. The method of claim 1, wherein the compensation is applied to a reconstructed version of video frame data that is different from an original version of that video frame data.

3. The method of claim 2, wherein temporal estimation is performed on two or more subsets of frames of video frame data by two or more processing resources.

4. The method of claim 1, wherein the first subset of frames of video frame data comprises one or more original current frames and one or more original reference frames.

5. The method of claim 4, wherein the temporal estimation comprises finding one or more blocks derivable from the original reference frames that best match, by some metric, one or more of the blocks within the original current frame.

6. The method of claim 4, wherein the temporal estimation comprises using blocks derivable from one or more reference frames and using blocks derivable from some portion of an original current frame.

7. The method of claim 3, wherein assignment of the video data to the processing resources is centrally managed.

8. The method of claim 3, wherein assignment of the video data to the processing resources is self managed.

9. The method of claim 3, wherein a plurality of processing resources performs temporal estimation on a same set of video frames using different algorithms, comprising: generating one or more temporal estimation results and one or more corresponding performance metrics associated with the one or more temporal estimation results; and using the performance metrics to select favorable temporal estimation results.

10. An apparatus for parallelizing video compression comprising a memory for storing video data, a temporal estimation manager, a plurality of processing resources, and a processor for compressing the video data using temporal estimation data derived in parallel by the plurality of processing resources to generate lossy compression using a reconstructed version of at least a portion of the video data in a closed loop encoder, wherein the plurality of processing resources are configured for performing temporal estimation on a set of video frame data by, for each of at least some frames of the video frame data, comparing the frame of video frame data with at least one other frame of video frame data, wherein the at least one other frame of video frame data is an original frame of video frame data that has not been compressed decompressed in the course of said video compression, wherein temporal estimation of a first subset of frames of the video frame data is computed independently of, and in parallel with, temporal estimation of a second subset of frames of the video frame data; and
one or more compensation processing resources for performing compensation using reconstructed frames of video frame data that have been compressed and decompressed in the course of said video compression.

11. The apparatus of claim 10, wherein each of the processing resources is chosen from the set of: a thread, a central processing unit (CPU), CPU core, a graphics processing unit (GPU), and application specific integrated circuit (ASIC), and a server processor.

12. The apparatus of claim 11, wherein at least one of the following: (a) a plurality of resources are located on a shared piece of hardware; (b) different ones of the resources are located on physically separate hardware but which have common direct access to the memory; (c) different ones of the resources are located on physically separate hardware and do not have direct access to the memory.

13. A non-transitory computer-readable medium comprising instruction for performing the steps of: (a) distributing subset of frames of video frame data to two or more temporal estimation processing resources operating in parallel; (b) performing temporal estimation on a set of video frame data by, for each of at least some frames of the video frame data, comparing the frame of video frame data with at least one other frame of video frame data, wherein the at least one other frame of video frame data is an original frame data that has been compressed or decompressed in the course of said video compression, wherein temporal estimation of a first subset of frames of the video frame data is computed independently of, and in parallel with, temporal estimation of a second subset of frames of the video frame data; (c) incorporating one or more temporal estimation results and one or more performance metrics returned by the temporal estimation processing resources in the compensation of video frame data using reconstructed reference frames which are different than original reference frames; and (d) performing compensation using reconstructed frames of video frame data that have been compressed and decompressed in the course of said video compression.

14. A method of video compression of a sequence of video frames comprising: performing primary temporal estimation on a set of video frame data, wherein temporal estimation of a first subset of the video frame data is computed independently of, and in parallel with, temporal estimation of a second subset of frames of the video frame data using original video frame data, comprising performing temporal estimation on a set of video frame data by, for each of at least some frames of the video frame data, comparing the frame of video frame data with at least one other frame of video frame data, wherein the at least one other frame of video frame data is an original frame of video frame data that has not been compressed or decompressed in the course of said video compression, wherein temporal estimation of a first subset of frames of the video frame data is computed independently of, and in parallel with, temporal estimation of a second subset of frames of the video frame data; using results of said primary temporal estimation, performing secondary temporal estimation on the set of video frame data using reconstructed video frame data; and using results of said primary and secondary temporal estimation, performing compensation of at least one of the first subset of frames of video frame data and the second subset of frames of video frame data in a manner which is dependent on compensation of the other of the first subset of frames of video frame data and the second subset of frames of video frames data;

wherein said compensation is performed using reconstructed frames of video frame data that have been compressed and decompressed in the course of said video compression.

15. A system for video compression of a sequence of video frames comprising: a plurality of temporal estimation processing resources for performing temporal estimation on a set of video frame data, wherein estimation of a first subset of the frames of the video frame data is computed independently of, and in parallel with, temporal estimation of a second subset of frame of the video frame data, wherein the plurality of temporal estimation processing resources are configured for performing temporal estimation on a set of video frame data by, for each of at least some frames of the video frame data, comparing the frame of video frame data with at least one other frame of video frame data, wherein the at least one other frame of video frame data is an original frame of video frame data that has not been compressed or decompressed in the course of said video compression, wherein temporal estimation of a first subset of frames of the video frame data is computed independently of, and in parallel with, temporal estimation of a second subset of frames of the video frame data; and coupled to the plurality of temporal estimation processing resources, one or more compensation processing resources for, using results of said temporal estimation, performing compensation of at least one of the first subset of frames of video frame data and the second subset of frames of video frame data in a manner which is dependent on compensation of the other of the first subset of frames of video frame data and the second subset of frames of video frame data;

wherein the one or more compensation processing resources are configured to perform compensation using reconstructed frames of video frame data that have been compressed and decompressed in the course of said video compression.

16. A system for video compression of a sequence of video frames comprising: a plurality of primary temporal estimation processing resources for performing temporal estimation on a set of video frame data, wherein temporal estimation of a first subset of frames of the video frame data is computed independently of, and in parallel with, temporal estimation of a second subset of frames of the video frame data, wherein the plurality of primary processing resources are configured for performing temporal estimation on a set of video frame data by, for each of at least some frames of the video frame data, comparing the frame of video frame data with at least one other frame of video frame data, wherein the at least one other frame of video frame data is an original frame of video frame data that has not been compressed or decompressed in the course of said video compression, wherein temporal estimation of a first subset of frames of the video frame data is computed independently of, and in parallel with, temporal estimation of a second subset of frames of the video frame data; one or more secondary temporal estimation processing resources coupled to the primary temporal estimation processing resources for using results of said primary temporal estimation, performing secondary temporal estimation on the set of video frame data using reconstructed video frame data; and coupled to the plurality of second temporal estimation processing resources, one or more compensation processing resources for, using results of said temporal estimation, performing compensation of at least one of the first subset of frames of video frame data and the second subset of frames of video frame data in a manner which is dependent on compensation of the other of the first subset of frames of video frame data and the second subset of frames of video frame data;

wherein the one or more compensation processing resources are configured to perform compensation using reconstructed frames of video frame data that have been compressed and decompressed in the course of said video compression.

17. A non-transitory computer readable medium comprising instructions for: performing temporal estimation on a set of video frame data, wherein temporal estimation of a first subset of frames of the video frame data is computed independently of, and in parallel with, temporal estimation of a second subset of frames of the video frame data, comprising performing temporal estimation on a set of video frame data by, for each of at least some frames of the video frame data, comparing the frame of video frame data with at least one other frame of video frame data, wherein the at least one other frame of video frame data is an original frame of video frame data that has not been compressed or decompressed in the course of said video compression, wherein temporal estimation of a first subset of frames of the video frame data is computed independently of, and in parallel with, temporal estimation of a second subset of frames of the video frame data; and using results of said temporal estimation, performing compensation of at least one of the first subset of frames of video frame data and the second subset of frames of video frame data in a manner which is dependent on compensation of the other of the first subset of frames of video frame data and the second subset of frames of video frame data;

wherein said compensation is performed using reconstructed frames of video frame data that have been compressed and decompressed in the course of said video compression.

18. A non-transitory computer readable medium comprising instructions for: performing primary temporal estimation on a set of video frame data, wherein temporal estimation of a first subset of frames of the video frame data is computed independently of, and in parallel with, temporal estimation of a second subset of frames of the video frame data using original video frame data, comprising performing temporal estimation on a set of video frame data by, for each of at least some frames of the video frame data, comparing the frame of video frame data with at least one other frame of video frame data, wherein the at least one other frame of video frame data is an original frame of video frame data that has not been compressed or decompressed in the course of said video compression, wherein temporal estimation of a first subset of frames of the video frame data is computed independently of, and in parallel with, temporal estimation of a second subset of frames of the video frame data; using results of said primary temporal estimation, performing secondary temporal estimation on the set of video frame data using reconstructed video frame data; and using results of said primary and secondary temporal estimation, performing compensation of at least one of the first subset of frames of video frame data and the second subset of frames of video frame data in a manner which is dependent on compensation of the other of the first subset of frames of video frame data and the second subset of frames of video frame data;

wherein said compensation is performed using reconstructed frames of video frame data that have been compressed and decompressed in the course of said video compression.

\* \* \* \* \*